United States Patent [19]
Onoe et al.

[11] Patent Number: 5,653,655
[45] Date of Patent: Aug. 5, 1997

[54] SYNCHRONOUS BELT AND METHOD OF PRODUCING THE SAME

[75] Inventors: Susumu Onoe; Kaneteru Hasebe; Nobuyuki Kurihara; Keizou Nonaka; Masayuki Fujioka; Yukinori Fujita, all of Kobe, Japan

[73] Assignee: Bando Chemical Industries, Ltd., Japan

[21] Appl. No.: 492,699

[22] Filed: Jun. 20, 1995

[30] Foreign Application Priority Data

Jun. 22, 1994 [JP] Japan .................. 6-140435

[51] Int. Cl.⁶ .................. F16G 1/28; F16G 5/20
[52] U.S. Cl. .................. 474/205; 474/250; 474/268
[58] Field of Search .................. 474/205, 153, 474/202, 204, 250, 268

[56] References Cited

U.S. PATENT DOCUMENTS

| | | | |
|---|---|---|---|
| 3,977,265 | 8/1976 | Worley et al. | 474/205 X |
| 4,000,240 | 12/1976 | Green et al. | 264/229 |
| 4,053,547 | 10/1977 | Redmond | 264/102 |
| 5,112,282 | 5/1992 | Patterson | 474/260 |
| 5,310,386 | 5/1994 | Mizuno et al. | 474/205 |
| 5,378,206 | 1/1995 | Mizuno et al. | 474/205 X |
| 5,531,649 | 7/1996 | Osako et al. | 474/205 |
| 5,545,097 | 8/1996 | Kitazumi et al. | 474/266 |

FOREIGN PATENT DOCUMENTS

| | | |
|---|---|---|
| 0086063 | 2/1982 | European Pat. Off. . |
| 0466169 | 7/1990 | European Pat. Off. . |
| 58-033442 | 2/1983 | Japan . |
| 61-262246 | 11/1986 | Japan . |
| 63-76935 | 4/1988 | Japan . |
| 544131 | 2/1993 | Japan . |
| 5346140 | 12/1993 | Japan . |

*Primary Examiner*—Roger J. Schoeppel
*Attorney, Agent, or Firm*—Sixbey, Friedman, Leedom & Ferguson, P.C.; Gerald J. Ferguson, Jr.; Tim L. Brackett, Jr.

[57] ABSTRACT

A synchronous belt of the present invention has a tension member in the form of a cord, a plurality of teeth fixedly provided on one side of the tension member at set intervals in a longitudinal direction of the belt and a back layer bonded to the other side of the tension member. The back layer and the teeth are formed of urethane elastomer. The tension member is formed of inorganic fibers and is impregnated with a water based latex adhesive. A film of an epoxy adhesive is formed on the surface of the tension member.

10 Claims, 2 Drawing Sheets

SYNCHRONOUS BELT AND METHOD OF PRODUCING THE SAME

BACKGROUND OF THE INVENTION

This invention relates to improvements of a synchronous belt and improvements of a method of producing the synchronous belt, and particularly relates to improvements of a cord of a synchronous belt having no facing fabric.

In power transmission belts used for office automation (OA) gears, especially in synchronous belts such as a miniature synchronous belt, there have been used for teeth two types of materials, i.e., vulcanized rubber and casting urethane elastmer. Out of these two types of materials, the latter is generally used with a cord made of aramid fibers which serves as a tension member (See Japanese Patent Application Laid-Open Gazette No.5-44181), because the aramid fiber is excellent in properties such as strength, elasticity and heat resistance. Otherwise, a cord composed of a metallic wire would be susceptible to rust and possess excessive stiffness. On the contrary, since a cord made of polyester fibers has low stiffness (small modulus of elasticity), this is unsuitable for heavy duty power transmission.

However, the synchronous belt using a cord made of aramid fibers has a problem in its use for household electrical appliances and OA gears in which the center distance between pulleys is fixed, because the cord is increased about 0.20% in length due to the absorption of moisture.

Meanwhile, a cord made of glass fibers has been also used in many rubber-made synchronous belts because of its excellent dimensional stability (See Japanese Patent Application Laid-Open Gazette No.63-76935).

In this view, it can be considered to form a cord from inorganic fibers such as glass fiber having excellent dimensional stability and use it in a synchronous belt made of casting urethane elastomer. However, such a cord formed of glass fibers have been seldom used in the synchronous belts made of casting urethane elastomer.

It can be assumed that (a) one of the reasons is that the cord is susceptible to damage from a mold at the molding and that (b) the other reason is that inter-filament parts of the cord are impregnated with casting urethane elastomer thereby rising stiffness. These two reasons (a) and (b) will discuss below in detail.

First, discussion is made about the reason (a). Since the teeth of the synchronous belt made of casting urethane elastomer cannot be coated with a facing fabric, the cord of the synchronous belt is damaged.

If a synchronous belt with a facing fabric is produced by the use of casting urethane elastomer, there may be employed the manner that rolls a facing fabric around an inner mold which has at the periphery a teeth-like forming surface for forming a bottom face of the synchronous belt, winds a cord around the facing fabric, sets outside the inner mold a cylindrical outer mold having at the inner periphery a forming surface for forming a back face of the synchronous belt and pours urethane elastomer into a space between the facing fabric and the outer mold. However, since the urethane elastomer has a low viscosity to pass through textures of the facing fabric, it is impossible to press the facing fabric against the teeth-like forming surface of the inner mold. Therefore, whereas most of rubber-made synchronous belts each have teeth coated with a facing fabric, there can be obtained no synchronous belt made of urethane elastomer which has teeth coated with a facing fabric.

Therefore, the synchronous belts are produced with no facing fabric provided, so that, in many cases, the portions of the cord located at bottom lands are not coated with urethane elastomer to be exposed. Meanwhile, on the teeth-like forming surface of the inner mold, projections are formed for preventing the displacement of the cord. When the molded synchronous belt is removed from the inner mold, the cord may be damaged by the projections of the inner mold.

Next, discussion is made about the reason (b). In the formation of the synchronous belt made of urethane elastomer, urethane elastomer is generally poured under a reduced pressure for ease of the pouring and for degassing, so that casting urethane elastomer is entered to inter-filament parts of the cord thereby extremely hardening the cord. Such hardened cord is readily broken and readily generates heat at the belt run.

SUMMARY OF THE INVENTION

An object of the present invention is, in a synchronous belt having no facing fabric at its bottom face, to prevent a cord from being impregnated with low-viscosity urethane elastomer for forming teeth and a back layer by subjecting the cord to adhesion treatment at the stage that the cord is in strands and the stage after it is twisted, thereby ensuring the flexibility of the cord to accomplish a long life of the belt. Another object of the present invention is to avoid the contact of the cord with a mold at the molding of the belt by coating the cord with the adhesive thereby securely preventing fibers of the cord from being damaged due to the contact with the mold.

<Synchronous belt>

To attain the above object, a synchronous belt of the present invention comprises: a tension member composed of a cord extending over the belt length; a plurality of teeth fixedly provided on one side of the tension member at set intervals in a longitudinal direction of the belt; and a back layer bonded to the other side of the tension member, wherein the back layer and the teeth are so formed that urethane elastomer is subjected to cast molding, the urethane elastomer forming the teeth is exposed at each bottom land, the cord forming the tension member is made of inorganic fibers, and the cord is so formed as to be impregnated with a water based latex adhesive and then coated with a film of an epoxy adhesive.

In the present invention, the film of an epoxy adhesive avoids the urethane elastomer from entering the inside of the cord at the time of cast molding to prevent the cord from increasing in stiffness due to the entrance of the urethane elastomer. Further, the film of an epoxy adhesive protects the inorganic fibers of the cord against being damaged by projections of an inner mold. In addition, the water based latex adhesive with which the cord is impregnated ensures the flexibility of the cord to enhance the durability of the synchronous belt. In detail, when the synchronous belt is run under heavy load for a long time, the cord is repeatedly flexed with a heavy strength. However, the synchronous belt of the present invention is hard to be broken because of the flexibility contributed by the water based latex adhesive.

As the inorganic fiber, there can be used a carbon fiber, and particularly there can be suitably used a glass fiber. Suitable for such a glass fiber is a fiber made of high-strength glass such as E-glass (no-alkaline glass). For example, there can be suitably used a glass-fiber strand so formed that two hundred glass fibers with a filament diameter of 7 μm to 9 μm are bound by a binder. However, an inorganic fiber to be used in the present invention is not limited to the above-mentioned types of fibers.

As the water based latex adhesive, there can be suitably used a mixed solution of blocked isocyanate dispersion and a resorcine formaldehyde rubber latex liquid (hereinafer, referred to as an RFL liquid).

As the blocked isocyanate, there can be suitably used blocked isocyanate so formed that polyisocyanate having three or more isocyanate groups in every molecule is blocked by lactam or oxime.

Here, the above polyisocyanate having three or more isocyanate groups in every molecule means (a) a single multifunctional isocyanate compound such as a triisocyanate compound, or (b) a mixture of the above multifunctional isocyanate compound and diisocyanate and/or monoisocyanate.

Examples of the multifunctional isocyanate compound of (a) are triisocyanates such as triphenylmethane-4,4',4''-triisocyanate, butane-1,2,2-triisocyanate, a trimethylolpropane tolylene diisocyanate addition product (e.g., "Desmodur L" produced by Bayer A. G.) and 2,4,4'-diphenylether triisocyanate.

The mixture of (b) is expressed by the following general formula:

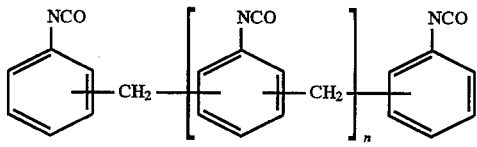

wherein n is 0, 1, 2, 3, 4 or more.

As the mixture of (b), there can be used polymethylene polyphenyl isocyanate (PAPI) or the like.

The blocked isocyanate of the present invention is formed by reacting one or more types of above-mentioned polyisocyanate and one or more types of lactam or oxime in a well-known manner. Examples of the lactam are propiolactam, butyrolactam, caprolactam and valerolactam. On the other hand, examples of the oxime are acetoxime, methyl ethyl ketone oxime, cyclohexanone oxime and benzophenone oxime.

The RFL liquid to be used in the present invention is a mixed water solution of a precondensate obtained by reacting resorcine and formaldehyde through acid or alkaline catalyst and one or more types of latex selected out of styrene-butadiene latex, carboxyl group-contained styrene-butadiene latex, styrene-butadiene-vinylpyridine latex, acrylonitrile-butadiene latex, polychloroprene latex, polybutadiene latex and natural rubber latex. The mole ratio of resorcine with respect to formaldehyde is preferably within the range of 0.5 to 4. The mixture ratio of the resorcine-formaldehyde precondensate and the latex is preferably within the range of 2:98 to 15:85 in a unit of weight ratio of solid part.

An important ingredient in the above-mentioned adhesive is an isocyanate ingredient of blocked isocyanate. It is essential that the isocyanate compound is polyisocyanate having three or more isocyanate groups per molecule. In the case of using an isocyanate compound which has only two or less isocyanate groups per molecule, e.g., diisocyanate such as diphenylmethane diisocyanate, tolylene diisocyanate and hexamethylene diisocyanate or monoisocyanate such as phenyl isocyanate, it is difficult to attain the objects of the present invention. The reason for this can be assumed that if a three-dimensional network structure is formed by using polyisocyanate molecules having three or more functional groups, this is effective at increasing the adhesive in heat resistance.

As a blocking agent for the blocked isocyanate, there are commonly known phenols, aliphatic alcohols and amines in addition to the above-mentioned types of lactam and oxime. Since the above blocking agents other than lactam and oxime are unsuitably high in dissociation temperature and cause damage to polyester after dissociation, they are not preferable for use in the present invention.

The water based latex adhesive is preferably prepared in such a manner that the blocked isocyanate dispersion and the RFL liquid are mixed so as to be 1:9 to 4:6 in weight ratio of solid part. In this manner, the synchronous belt is adjusted to the correct stiffness while obtaining an adhesion effect on inorganic fibers forming the cord. In other words, if the weight ratio of solid part is less than 1:9, the adhesion effect is insufficient. On the contrary, if the weight ratio of solid part is more than 4:6, the cord becomes disadvantageously hard.

A solids content of the water based latex adhesive is preferably within the range of 20 to 30 wt % with respect to the total weight of a material for cord and the solid part of the water based latex adhesive. Within this range, the inorganic fibers can be evenly impregnated with the latex adhesive thereby advantageously preventing the later entrance of epoxy adhesive.

A solids content of the epoxy adhesive is preferably within the range of 3 to 8 wt % with respect to the total weight of the material for cord, the solid part of the water based latex adhesive and the solid part of the epoxy adhesive. Within this range, the cord can be coated with a film having a suitable thickness for preventing the entrance of urethane elastomer and for preventing the damages of the cord.

As an epoxy compound for the epoxy adhesive, there can be preferably used a polyepoxy compound having two or more epoxy groups per molecule. Examples of such a polyepoxy compound are a product formed by the reaction of polyhydric alcohol such as ethylene glycol, glycerin, sorbitol and pentaerythritol or polyalkylene glycol such as polyethylene glycol with a halogen-contained epoxy compound such as epichlorohydrine, and a product formed by the reaction of polyhydric phenol such as resorcin and bis(4-hydroxyphenyl) dimethyl ethane or phenol resin such as phenol-formaldehyde resin and resorcin-formaldehyde resin with a halogen-contained epoxy compound such as epichlorohydrine.

<Method of producing a synchronous belt>

The above synchronous belt can be produced in the following method.

In detail, the method is for producing a synchronous belt which comprises a tension member, a plurality of teeth fixedly provided on one side of the tension member at set intervals in a longitudinal direction of the belt and a back layer bonded to the other side of the tension member. This method comprises the steps of: impregnating a strand made of inorganic fibers with a water based latex adhesive; twisting a plurality of the strands impregnated with the water based latex adhesive to form a material for cord; applying an epoxy adhesive to the material to form a cord whose surface is coated with a film of the epoxy adhesive; winding the cord spirally around an inner mold whose outer periphery is a teeth-like forming surface for forming a bottom face of the synchronous belt; setting, outside the inner mold around which the cord is wound, a cylindrical outer mold whose inner periphery is a forming surface for forming a back face of the synchronous belt; and pouring a liquid of urethane elastomer into a cavity between the inner mold and outer mold and then heat-hardening it.

A suitable inorganic fiber is a glass fiber.

The impregnation treatment with the water based latex adhesive may be conducted in such a manner that two parallel-arranged strands are impregnated with the latex adhesive by means of spraying, dipping, coating or the like and then the strands are subjected to common heat treatment, for example, in which they are passed through hot wind. The heat treatment is preferably conducted at a temperature of 200° to 350° C. for 1 to 10 minutes.

For the water based latex adhesive, there can be suitably used a mixture of blocked isocyanate dispersion and an RFL liquid. Preferably, the blocked isocyanate dispersion and the RFL liquid are so mixed that they are 1:9 to 4:6 in weight ratio of solid part.

Further, the impregnation treatment is preferably conducted so that a solids content of the water based latex adhesive is 20 to 30 wt % with respect to the total weight of the material for cord and the solid part of the latex adhesive.

In the adhesion treatment with the epoxy adhesive, there is no particular limitation to an organic solvent for the adhesive. For this organic solvent, suitably used are aromatic hydrocarbon such as benzene, xylene and toluene, aliphatic ketone such as methyl ethyl ketone and methyl isobutyl ketone, and ester such as ethyl acetate and amyl acetate. Such solvent adhesives are not particularly limited in concentration of solid part. The concentration of solid part is preferably within the range of 10 to 50 wt %.

The adhesion treatment with the epoxy adhesive is conducted in the common manner after the impregnation treatment is conducted with the water based latex adhesive. In detail, the adhesion treatment is conducted in such a manner that the material for cord is dipped into an adhesive composition in which the epoxy adhesive is dissolved in a solvent, is retrieved and is then as necessary subjected to heat treatment. Thus, a film is formed on the surface of the cord. It is essential only that the heat treatment is conducted to the extent that the adhesive composition applied to the fibers is fixed by reaction. In general, the heat treatment may be conducted at a temperature of 250° C. or less, e.g., at 120° to 250° C., for several minutes.

A solids content of the epoxy adhesive to the material for cord is suitably 3 to 8 wt % in weight ratio of solid part.

Preferably, a set primary twist is given to the strand to which the water based latex adhesive is applied, a set of two to five strands thus twisted are parallel-arranged, a final twist opposite in direction to the primary twist is given to the set of strands thereby forming a material for cord, and then the epoxy adhesive is applied to the material.

In case of a cord to which the epoxy adhesive is not applied, low-viscosity urethane elastomer enters the interfilament parts of the cord in molding the belt so that the cord is significantly hardened thereby degrading flex fatigue resistance. However, according to the present invention, the film of the epoxy adhesive formed on the cord surface prevents the entrance of the urethane elastomer, and eliminates the unevenness in adhesive strength of the inorganic fibers and the decrease in flex fatigue resistance of the inorganic fibers.

Further, the epoxy compound of the epoxy adhesive is resinified at the vulcanization of the urethane elastomer to enhance the adhesive strength of the film to the inorganic fibers such as glass fibers, and reacts with methylol groups contained in the RFL liquid of the water based latex adhesive to form a tight film.

DESCRIPTION OF THE PREFERRED EMBODIMENTS

The present invention is not limited to the below-mentioned embodiments.

(Structure of a synchronous belt)

Figure 1:
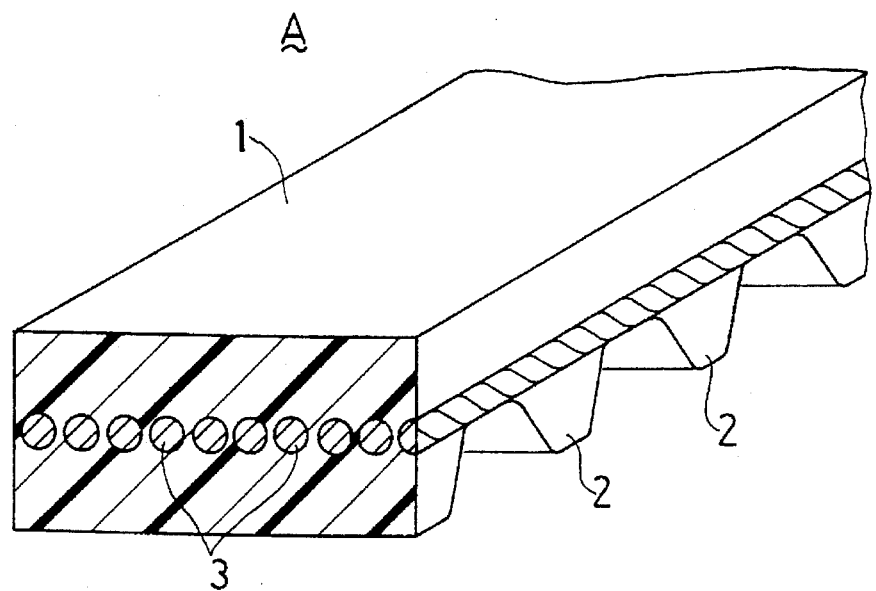
FIG. 1 is a perspective view partially showing a synchronous belt.

As shown in FIG. 1, a synchronous belt A is composed of a back layer 1, a plurality of teeth 2 and a cord 3. The plural teeth 2 are integrally provided on a surface of a cord 3 as a tension member (on the underside of FIG. 1). The back layer 1 is formed on the other surface of the tension member. The bottom face of the teeth 2 are not covered with a facing fabric.

(Treatment of a cord)

Conditions of treatment to respective cords of Samples 1 to 8 are shown in the below-mentioned Table 1. Since the details of the treatment are common to Samples 1 to 8, only Sample 1 is exemplified and explanation is omitted on other Samples 2 to 8.

Two glass strands of ECG150 type under the Japanese Industrial Standards are parallel-arranged, are dipped, for five seconds, into a treatment liquid of a blocked isocyanate-RFL mixed adhesive (hereinafter, referred to as a first adhesive) prepared as below and are then subjected to heat treatment in heated air of 220° C. for 90 seconds.

The first adhesive is a water based latex adhesive which is so formed that 400 parts of dispersion of polymethylene polyphenyl isocyanate ("Millionate MR" produced by Nippon Polyurethane Industries Co., Ltd.) blocked by ε-caprolactam as blocked isocyanate dispersion is mixed with 600 parts of an RFL liquid.

The blocked isocyanate dispersion is so prepared that 0.6 parts of methylcellulose, 0.3 parts of sodium alkyl sulfonate, 0.1 parts of polyethyleneglycol monolaurylate and 20 parts of ε-caprolactam-blocked polymethylene polyphenyl isocyanate are added to 79 parts of water and are then crushed by a ball mill for 24 hours.

The RFL liquid is so obtained that 5.7 parts of resorcine, 6.3 parts of 37% formaldehyde water solution and 3 parts of 100% caustic soda water solution are added to 185.7 parts of water and matured at 30° C. for 6 hours and then to the resulting liquid there are added 175.7 parts of butadiene-styrene-vinylpyridine latex having 41% solid part ("Nipol 2518FS" produced by Nippon Zeon Co., Ltd.) and 23.8 parts of water.

In the glass strands thus obtained, an amount of application of solid part (a solids content) of the first adhesive was 25%.

The glass strands were primary-twisted 16 times per 10 cm in Z direction to be formed into a primary twist yarn. Three primary twist yarns thus obtained were parallel-arranged, and were final-twisted 16 times per 10 cm in S direction opposite to the primary-twisting direction to be formed into a glass cord as a material for cord. Thereafter, the material for cord was subjected to adhesion treatment with an epoxy compound (epoxy adhesive) as a second adhesive. In detail, the material for cord was dipped into a treatment liquid in which a bisphenol. A type epoxy resin and an amine hardener are dissolved in an organic solvent and then dried. An amount of application of solid part of the epoxy adhesive was 4 wt %.

7

(Molding of a synchronous belt)

Figure 2:
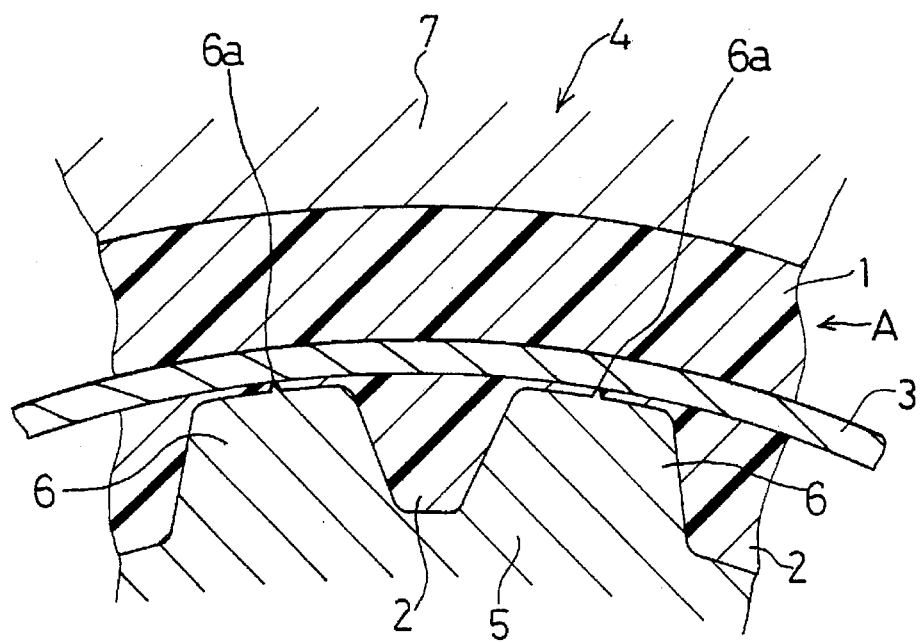
FIG. 2 is a sectional view partially showing a casting mold and the synchronous belt in molding the belt.

As shown in FIG. 2, the cord 3 obtained through the above two stages of adhesion treatment was spirally wound around an inner mold 5 of a casting mold 4, and then an outer mold 7 was set outside the inner mold 5. Thereafter, casting urethane elastomer was poured into a cavity between the inner and outer molds 5, 7 under a reduced pressure, was degassed and was then heat-hardened thereby obtaining a synchronous belt A.

In the inner mold 5, there is formed a teeth-like forming surface 6 corresponding to the shape of the bottom face of the synchronous belt A. At a top end of each tooth of the forming surface 6, a projection 6a is linearly provided in a belt width direction.

(Cord of Sample 9)

Sample 9 used a cord obtained by subjecting a final twist yarn made of aramid fibers of 400de/1×3 ("KEVLAR" produced by Du Pont) to adhesion treatment with EX521 which is an epoxy adhesive commercially available from Nagase Sangyo K.K. An amount of application of solid part of the epoxy adhesive was 5 wt %.

(Evaluation of synchronous belts)

The below-mentioned Table 1 shows test results of respective synchronous belts A formed by use of the above sample cords. Test details on evaluation items of Table 1 are as follows.

<Index of belt damage due to mold>

This index depends on a state of the film formed on a cord surface by the second adhesive. When the molded synchronous belt was peeled off from the inner mold and was then cut to a set width in a belt length direction, a state of filaments of the cord was graded. 0 indicates filaments have no breakage, 1 indicates filaments are slightly damaged and 2 indicates many filaments are broken.

<Index of belt stiffness (value of EI), unit: Ncm$^2$>

This index is for examination about how much the second adhesive entered the cord depending on an amount of application of the first adhesive. In the case of small amount of application of the first adhesive, casting urethane elastomer enters the cord to harden the belt. The same thing also occurs in the case of large amount of application of an overcoat (second adhesive). For measurement, an Olsen bending stiffness tester was used. The index of stiffness of a synchronous belt having S-shaped teeth and a 3 mm tooth pitch (hereinafter, referred to as S3M type) and using "Kevlar" as fibers for cord is 1.01 Ncm$^2$, and the index of stiffness of an S3M type synchronous belt using glass fibers as fibers for cord is 1.31 Ncm$^2$.

<Adhesive strength of a cord (N)>

This value shows a static adhesive strength of a cord of a synchronous belt A. The value of the S3M type belt using "Kevlar" as fibers for cord is 83.2N, and the value of the S3M type belt using glass fibers as fibers for cord is 94N.

<Belt life (hr)>

Figure 3:
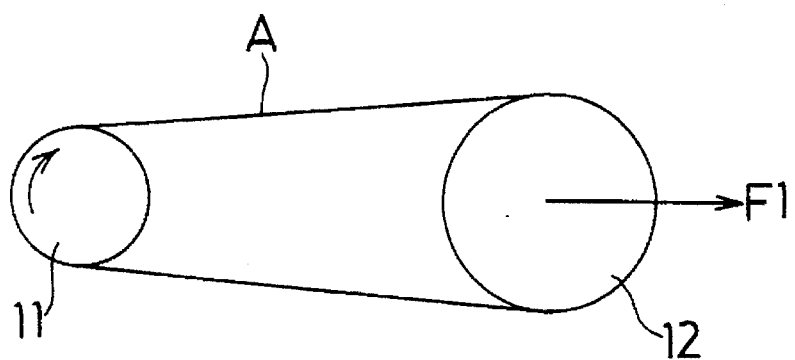
FIG. 3 is an explanatory diagram of the measurement of a belt life.

Each synchronous belt A for test sample is an S3M type one and a 60 mm width×a 486 mm length in size. The synchronous belt of this type was set to a biaxial running tester shown in FIG. 3 so as to be wound between an S3M type driving pulley 11 of a 20 mm diameter and an S3M type driven pulley 12 of a 38 mm diameter, and was run at 2500 rpm under conditions that a 6.6 kg weight was assigned in a direction of an arrow F1 and a 400 W load was applied.

<Dimensional changing ratio of belt due to absorption of moisture (%)>

8

Figure 4:
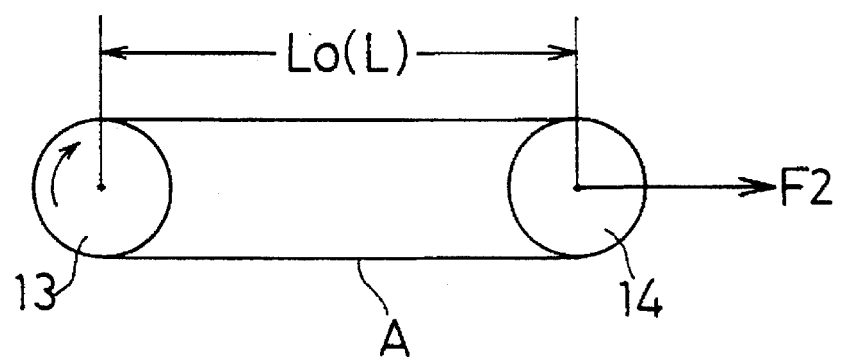
FIG. 4 is an explanatory diagram of the measurement of dimensional change of the belt due to the absorption of moisture.

Each synchronous belt A for test sample is an S3M one and a 60 mm width×a 486 mm length in size. The synchronous belt of this type was set to a biaxial running tester shown in FIG. 4 so as to be wound between an S3M type driving pulley 13 of a 30 mm diameter and an S3M type driven pulley 14 of a 30 mm diameter, and was run at 2500 rpm under conditions that a 6.6 kg weight was assigned in a direction of an arrow F2 and a 400 W load was applied. Supposed that Lo is a central distance of the synchronous belt A after aging at 55° C. for 24 hours and L is a central distance of the same type synchronous belt A after aging at 45° C. for 24 hours under 95% relative humidity. The dimensional changing ratio was measured according to the following formula.

$$\text{Dimensional changing ratio } (\%) = ((Lo-L)/Lo) \times 100$$

Further, respective amounts of application of solid part of the first and second adhesives in Table 1 were obtained in the below-mentioned manner.

<Amount of application of solid part of the first adhesive (%)>

A glass cord treated with the first adhesive was burned at 700° to 800° C. and then the remaining weight of the glass cord was calculated according to the following formula:

$$((w_1-w_0)/w_1) \times 100 = A \ (wt \ \%)$$

wherein $W_1$ is a weight of the glass cord treated with the first adhesive, $W_0$ is a weight of the glass cord after the burning and A is an amount of application of solid part of the first adhesive to the glass cord.

<Amount of application of solid part of the second adhesive (%)>

An amount of application of solid part of the second adhesive to the glass cord was calculated according to the following formulae:

$$((W_2-W_0)/W_2) \times 100 = B \ (wt \ \%); \text{ and}$$

$$B-A=C$$

wherein $W_2$ is a weight of the glass cord treated with the first and second adhesives, $W_0$ is a weight of the glass cord after the burning, B is a total amount of application of solid part of the first and second adhesives and C is an amount of application of solid part of only the second adhesive to the glass cord.

With regard to Sample 9 using "KEVLAR" of 400de/1×3, a weight of a cord per set length was previously measured, the cord was treated with an epoxy adhesive and dried, and then the amount of application of solid part of the epoxy adhesive was calculated.

TABLE 1

|  | Samples | | | | | | | | |
| --- | --- | --- | --- | --- | --- | --- | --- | --- | --- |
|  | 1 | 2 | 3 | 4 | 5 | 6 | 7 | 8 | 9 |
| Ratio of NCO content in First Adhesive (%) | 10 | 20 | 5 | 50 | 10 | 10 | 10 | 10 | — |
| Amount of Application of Solid Part of First Adhesive (wt %) | 25 | 25 | 25 | 25 | 10 | 35 | 25 | 25 | — |
| Amount of Application of Solid Part of Second Adhesive (wt %) | 4 | 4 | 4 | 4 | 4 | 4 | 2 | 8 | — |
| Index of Belt Damage | 0 | 0 | 0 | 0 | 1 | 0 | 2 | 0 | 0 |
| Adhesive Strength of Cord (N) | 95 | 90 | 60 | 95 | 95 | 60 | 65 | 95 | 83 |
| Index of Belt Stiffness (Value of IE:Ncm$^2$) | 1.31 | 1.4 | 1.2 | 3.0 | 4.0 | 1.4 | 1.0 | 3.0 | 1.1 |
| Belt Life (hr) | 20 | 20 | 2 | 3 | 3 | 2 | 1 | 2 | 7 |
| Dimensional Changing Ratio of Belt due to Absorption of Moisture (%) | 0.03 | 0.03 | 0.03 | 0.03 | 0.03 | 0.03 | 0.03 | 0.03 | 0.20 |

The following are evident from Table 1.

Samples 1 and 2 obtained satisfactory results in all the evaluation items.

Sample 3 is small in ratio of NCO (isocyanate group) content of the first adhesive to be lack in adhesive strength thereby resulting in a short belt life.

Sample 4 is large in ratio of NC) content of the first adhesive, so that while it has good adhesive strength, belt stiffness is large thereby resulting in breakage at an early stage.

Sample 5 has small amount of application of the first adhesive so that epoxy resin of the second adhesive enters between filaments of a glass cord. This decreases a real amount of application of the second adhesive on the cord surface, that is, the film is thinned, so that the cord is damaged when the synchronous belt A is retrieved from the inner mold. In addition, since the epoxy resin enters between the filaments of the glass cord, cord stiffness or belt stiffness is increased. Due to these two factors, the belt is broken at an early stage.

Sample 6 is as large as 35% in amount of application of the first adhesive so that blister is generated when the glass strand is treated with the first adhesive thereby presenting a nonuniform cord surface. Accordingly, glass filaments are not entirely coated so that the adhesive strength of the cord and the belt running life are decreased.

Sample 7 has small epoxy amount of the second adhesive so that the glass cord surface is not entirely coated. As a result, the cord is damaged when the belt is retrieved from the inner mold as well as the cord has small adhesive strength to casting urethane elastomer, thereby resulting in a short belt life.

On the contrary, Sample 8 has large epoxy amount of the second adhesive. In this case, the belt is significantly hardened so that the mesh of the belt with pulleys is bad thereby resulting in a short belt life.

Sample 9 is a belt using "KEVLAR" as fibers for cord. Whereas this belt has good adhesive strength, its change in dimension is very large due to the absorption of moisture so that the belt is hard to be aligned with pulleys.

We claim:

1. A synchronous belt of the present invention comprising:
    a tension member composed of a cord extending over the belt length;
    a plurality of teeth fixedly provided on one side of the tension member at set intervals in a longitudinal direction of the belt; and
    a back layer bonded to the other side of the tension member,
    wherein the back layer and the teeth are so formed that urethane elastomer is subjected to cast molding,
    the urethane elastomer forming the teeth is exposed at each bottom land,
    the cord forming the tension member is made of inorganic fibers, and
    the cord is so formed as to be impregnated with a water based latex adhesive and then coated with a film of an epoxy adhesive, wherein the water based latex adhesive is a mixed solution of blocked isocyanate dispersion and an RFL liquid.

2. A synchronous belt according to claim 1, wherein the inorganic fiber is a glass fiber.

3. A synchronous belt according to claim 1, wherein the blocked isocyanate dispersion and the RFL liquid are so mixed that they are within 1:9 to 4:6 in weight ratio of solid part.

4. A synchronous belt according to any one of claims 1, 2 or 3, wherein a solids content of the water based latex adhesive is 20 to 30 wt % with respect to the total weight of the cord and the solid part of the water based latex adhesive.

5. A synchronous belt according to any one of claims 1, 2 or 3, wherein a solids content of the epoxy adhesive is 3 to 8 wt % with respect to the total weight of the cord, the solid part of the water based latex adhesive and the solid part of the epoxy adhesive.

6. A method of producing a synchronous belt which comprises a tension member, a plurality of teeth fixedly provided on one side of the tension member at set intervals in a longitudinal direction of the belt and a back layer bonded to the other side of the tension member, said method comprising the steps of:
    impregnating a strand made of inorganic fibers with a water based latex adhesive;
    twisting a plurality of the strands impregnated with the water based latex adhesive to form a material for cord;
    applying an epoxy adhesive to the material to form a cord whose surface is coated with a film of the epoxy adhesive;
    winding the cord spirally around an inner mold whose outer periphery is a teeth-like forming surface for forming a bottom face of the synchronous belt;
    setting, outside the inner mold around which the cord is wound, a cylindrical outer mold whose inner periphery is a forming surface for forming a back face of the synchronous belt; and pouring a liquid of urethane elastomer into a cavity between the inner mold and outer mold and heat-hardening it, wherein the water based latex adhesive is a mixed solution of blocked isocyanate dispersion and an RFL liquid.

7. A method of producing a synchronous belt according to claim 6, wherein the inorganic fiber is a glass fiber.

8. A method of producing a synchronous belt according to claim 6, wherein the blocked isocyanate dispersion and the RFL liquid are so mixed that they are within 1:9 to 4:6 in weight ratio of solid part.

9. A method of producing a synchronous belt according to any one of claims 6, 7 or 8, wherein the step of impregnating the strand made of inorganic fibers with a water based latex adhesive is so conducted that a solids content of the water based latex adhesive is 20 to 30 wt % with respect to the total weight of the cord and the solid part of the latex adhesive.

10. A method of producing a synchronous belt according to any one of claims 6, 7 or 8, wherein the step of applying the epoxy resin to the material for cord is so conducted that a solids content of the epoxy adhesive is 3 to 8 wt % with respect to the total weight of the cord, the solid part of the water based latex adhesive and the solid part of the epoxy adhesive.

* * * * *